(12) United States Patent
Liu

(10) Patent No.: US 7,492,488 B2
(45) Date of Patent: Feb. 17, 2009

(54) IMAGE SCANNING SYSTEM AND METHOD FOR SCANNER

(76) Inventor: Cathy Liu, No. 3, Lane 55, Guangfu 2nd St., Chiong Lin Hisan, Hsinchu (TW)

( * ) Notice: Subject to any disclaimer, the term of this patent is extended or adjusted under 35 U.S.C. 154(b) by 1611 days.

(21) Appl. No.: 09/832,098

(22) Filed: Apr. 11, 2001

(65) Prior Publication Data

US 2002/0149798 A1  Oct. 17, 2002

(51) Int. Cl.
 H04N 1/00 (2006.01)
 H04N 1/46 (2006.01)
 H04N 1/04 (2006.01)
(52) U.S. Cl. .................. 358/406; 358/504; 358/474; 358/496
(58) Field of Classification Search ............. 358/406, 358/474, 497, 504, 496; 235/462, 462.15; 318/803, 806; 250/208.1; 382/255, 272, 382/270, 274; 348/251
 See application file for complete search history.

(56) References Cited

U.S. PATENT DOCUMENTS

| | | | | |
|---|---|---|---|---|
| 4,402,015 A | * | 8/1983 | Yamada | 358/448 |
| 4,757,389 A | * | 7/1988 | Clark et al. | 358/406 |
| 5,278,674 A | * | 1/1994 | Webb et al. | 358/475 |
| 5,406,070 A | * | 4/1995 | Edgar et al. | 250/208.1 |
| 5,764,023 A | * | 6/1998 | Wieloch | 318/803 |
| 5,939,697 A | * | 8/1999 | Spitz | 235/462.15 |
| 6,172,772 B1 | * | 1/2001 | Steinle et al. | 358/406 |
| 6,295,386 B1 | * | 9/2001 | Ryu | 382/294 |
| 6,624,912 B1 | * | 9/2003 | Kim | 358/3.23 |
| 6,763,141 B2 | * | 7/2004 | Xu et al. | 382/255 |
| 6,900,448 B1 | * | 5/2005 | Thompson | 250/559.1 |
| 7,099,025 B2 | * | 8/2006 | Nagashima | 358/1.15 |
| 7,158,267 B2 | * | 1/2007 | Chiu | 358/406 |
| 2002/0122213 A1 | * | 9/2002 | Hill et al. | 358/474 |

* cited by examiner

Primary Examiner—Houshang Safaipour
(74) Attorney, Agent, or Firm—Stolowitz Ford Cowger LLP

(57) ABSTRACT

An image scanning system and method for a scanner that stores calibration parameters of the scanner in the memory of a control module or a selected system file. The image capturing element directly performs image capturing on the scanning object and through the calibration parameters to perform compensation and calibration process for the captured image such that the scanner needs no pre-scanning or only one pre-scanning to obtain the calibration parameter from empirical value thereby to directly perform image scanning on the scanning object.

38 Claims, 6 Drawing Sheets

IMAGE SCANNING SYSTEM AND METHOD FOR SCANNER

FIELD OF THE INVENTION

This invention relates to an image scanning system and for scanner and particularly a system and method that is capable of completing image scanning image rapidly without a pre-scanning process or one pre-scanning image scanning process.

BACKGROUND OF THE INVENTION

Optical scanner is a computer peripheral device that employs photoelectric conversion principle to convert scanning object image to digital data. The scanning method mainly includes projecting a linear light source on the scanning object, using an image capturing element to capture the image reflecting from the scanning object, then employing photoelectric conversion principle to convert the object image to digital signals for output.

Referring to FIG. 1A, a conventional optical scanner consists of a document holding board 10 for holding a scanning object 11 thereon which is generally a flat document, and an optical chassis 12 constructed in a modular manner which consists of a linear lamp tube 121, a plurality of reflection mirrors 122, a lens 123 and an image capturing element 124. During scanning operation, the linear lamp tube 121 projects light on the scanning object 11, and the reflection mirrors 122 receive the image reflecting from the scanning object 11. The reflection mirrors 122 are properly positioned such that they can receive the image reflecting from the scanning object 11 and transmit the image of the object 11 to the lens 123 which refracts and forms an image on the image capturing element 124. The image capturing element 124 employs photoelectric conversion principle to convert the image of the object 11 to digital signals. At this time, the scanned image data in the scanner is only a piece of the total object image. Hence a driving means (not shown in the drawing) shall be used to drive the optical chassis 12 to move along the holding board 10 for scanning the object image completely.

However, the scanner usually has to proceed a calibration process before performing the scanning operation. It mainly uses the image capturing element 124 to scan a calibration chart (not shown in the drawing) located inside the upper lid of the scanner. The calibration chart generally has a selected calibration pattern formed in black and white color at a staggered manner according to a specific calibration requirement. The image data obtained after scanning of the calibration chart will be processed to get a calibration parameter. The image capturing element then uses the calibration parameter to perform calibration for setting the left and right hand side margins, scanning starting position value and light intensity compensation and calibration value for the linear lamp tube. As the scanner which has processed the calibration can result in better scanning quality than the one which does not have calibration process, almost all scanners now being used perform calibration process and get the calculation parameter before proceeding formal scanning of the object, and through using the calibration parameter to perform the compensation and calibration for the scanning image to produce a better scanning image quality.

Referring to FIG. 1B, the image scanning process of a scanner adapted a conventional technique includes the steps of: providing a scanning object 131, performing a pre-scanning process and calculating the calibration parameter 132, using the image capturing element of the optical chassis to capture the image of the scanning object 133, performing image calibration and compensation according to the calibration parameter 134, and finishing object scanning 135 and repeating the step 131.

Although the calibration process may enable the scanner to get a better scanning quality for every scanning operation, the calibration process takes a lot of time. In fact, each calibration consumes about 7-8 seconds. Total time for scanning the object generally is slightly over ten seconds. Hence the calibration process takes a relatively large portion of the total scanning time. When the scanner is used for scanning a great amount of document, time being spent and wasted on calibration becomes significant.

Therefore it is desirable to design a scanner that does not need calibration for every scanning operation and which can directly scan the object without affecting scanning quality thereby to save a lot of calibration time and improve utilization efficiency of the scanner.

SUMMARY OF THE INVENTION

The primary object of this invention is to provide an image scanning system and method that offers calibration parameter without performing calibration process so that the scanner may directly perform object scanning for increasing scanning efficiency of the scanner.

Another object of this invention is to provide an image scanning system and method that performs a pre-scanning calibration before scanning, and uses the obtained calibration parameter as the calibration basis for subsequent scanning thereby enables the scanner to directly perform scanning for increasing efficiency.

The image scanning system of the scanner according to this invention consists of a transparent holding board, an optical chassis and a control module. The scanning object is located above the holding board and the optical chassis is located below the holding board. There is an image capturing element located inside the optical chassis for performing image scanning on the scanning object. In the control module or a selected systems file, there is a memory for storing the calibration parameters of the scanner.

When the memory is Read Only Memory (ROM), it can store the calibration parameters which are obtained through calibration parameter empirical value based on the scanner design specifications. Every time the scanner performs scanning operation, the image capturing element of the optical chassis reads the object image located above the holding board and uses the control module or selected system file to fetch the calibration parameter from the memory, then based on the calibration parameter to do compensation and calibration for getting a better quality of scanning image without performing calibration every time.

When the memory is a Random Access Memory (RAM), it can store the calibration parameters obtained from the pre-scanning when the scanner is initially powered on. Every time the scanner performs scanning operation, the image capturing element of the optical chassis reads the object image located above the holding board and uses the control module or selected system file to fetch the calibration parameter from the memory, then based on the calibration parameter to do compensation and calibration for getting a better quality of scanning image. The calibration may be done one time at the initial power on without performing calibration every time.

As the calibration parameters are stored in the memory of the control module, the scanner of this invention can directly perform scanning for the object without the need of doing calibration or calculating the calibration parameter every time. Scanning time thus will be greatly reduced and better scanning quality will be achieved, and may result in an increased scanning efficiency for the scanner.

The invention, as well as its many advantages, may be further understood by the following detailed description and drawings. The drawings are only to serve for reference and illustrative purpose, and do not intend to limit the scope of the present invention.

DETAILED DESCRIPTION OF THE PREFERRED EMBODIMENTS

This invention aims at providing an image scanning system and method characterized by storing calibration parameters of the scanner in the memory of a control module or a selected system file, and directly reading the calibration parameters stored in the memory from the control module during scanning, and based on the calibration parameters to perform compensation and calibration for the scanning image or directly execute the selected systems file. As this invention does not need to perform calibration for getting calibration parameters for every scanning, scanning of the object image can be done more rapidly. Moreover, through the calibration parameters to perform compensation and calibration for the scanning image, the scanning image of a better quality can be obtained. More details of this invention will be elaborated by referring to the following embodiments.

Figure 1A:
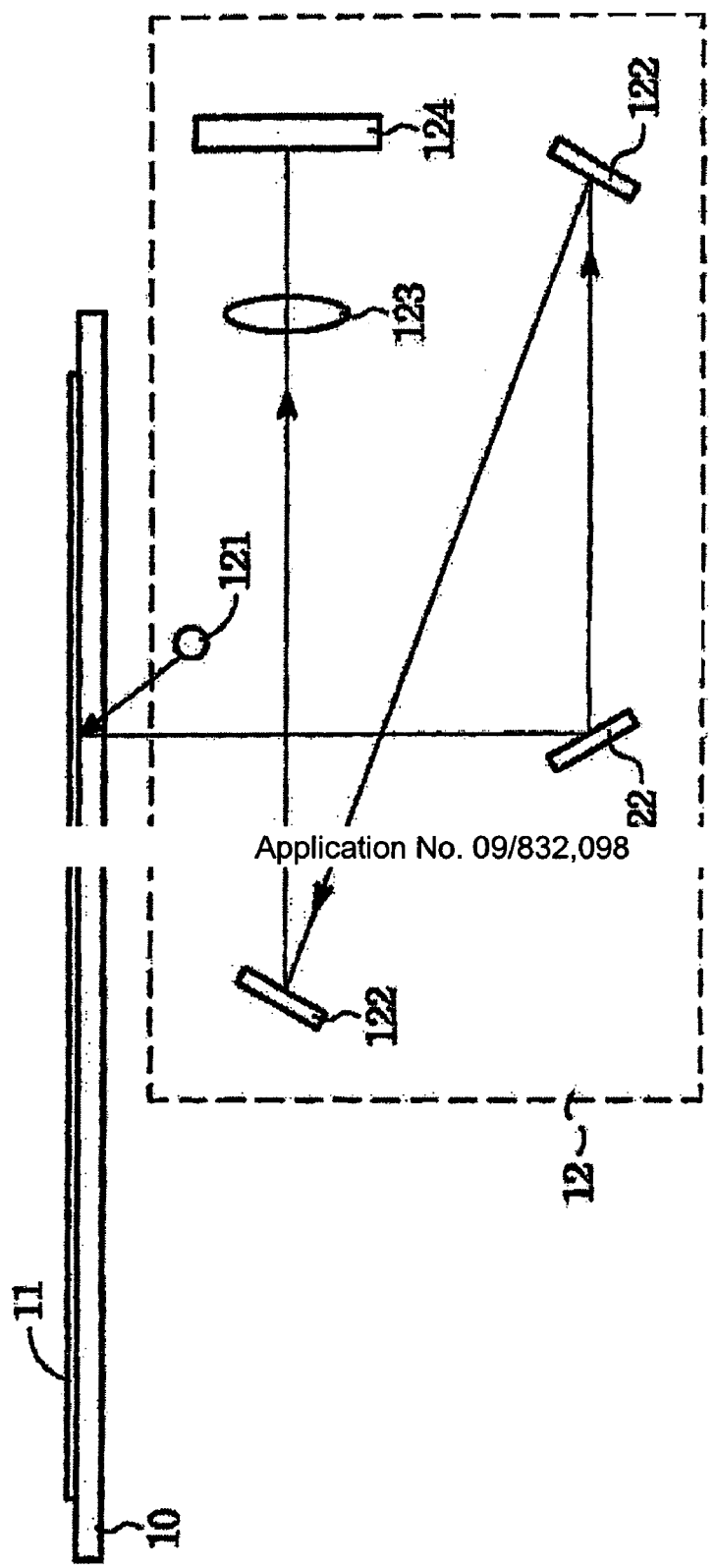
FIG. 1A is a schematic view of a scanner performing scanning operation adapted a conventional technique.
Figure 1B:
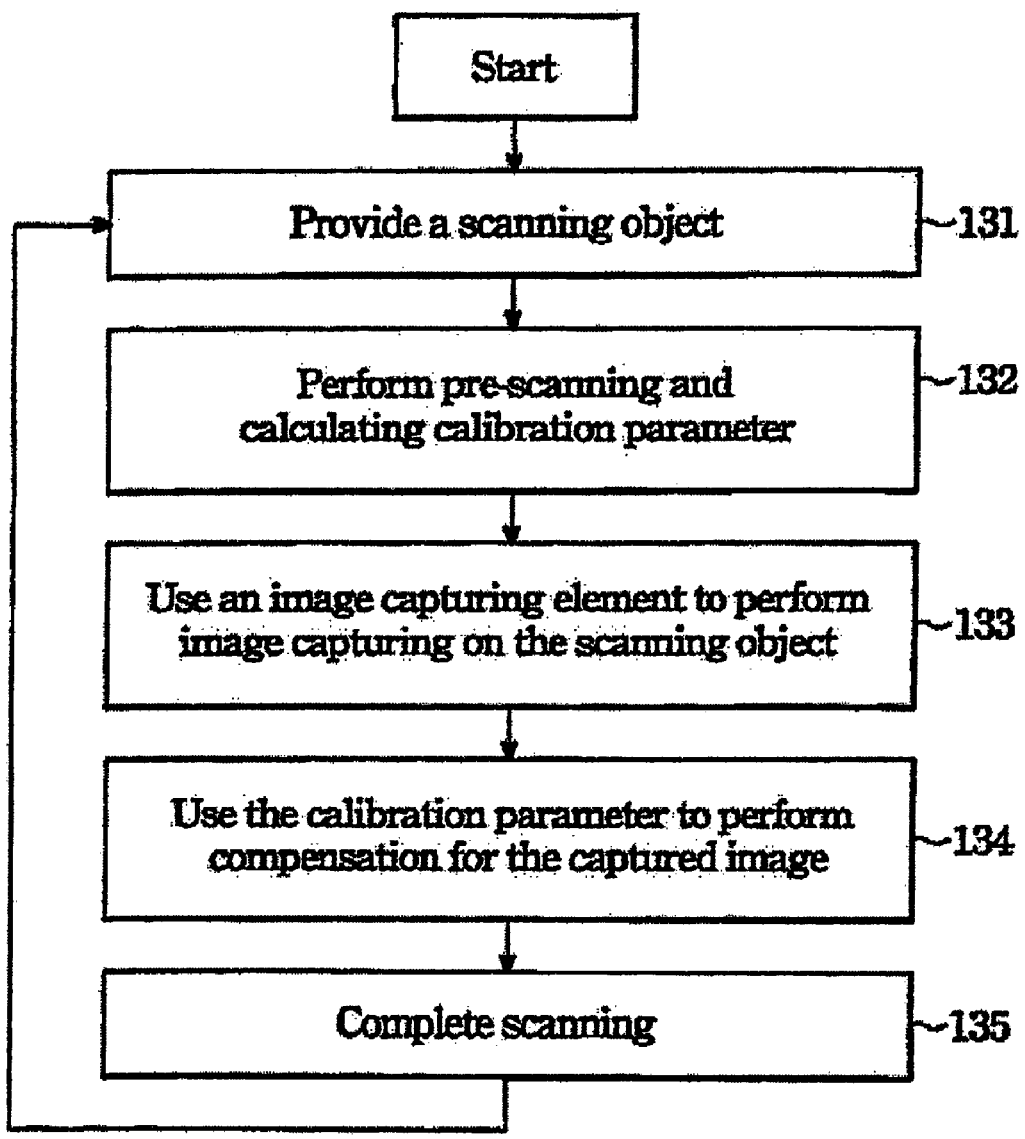
FIG. 1B is a process flow of a scanner performing scanning operation adapted a conventional technique.
Figure 2A:
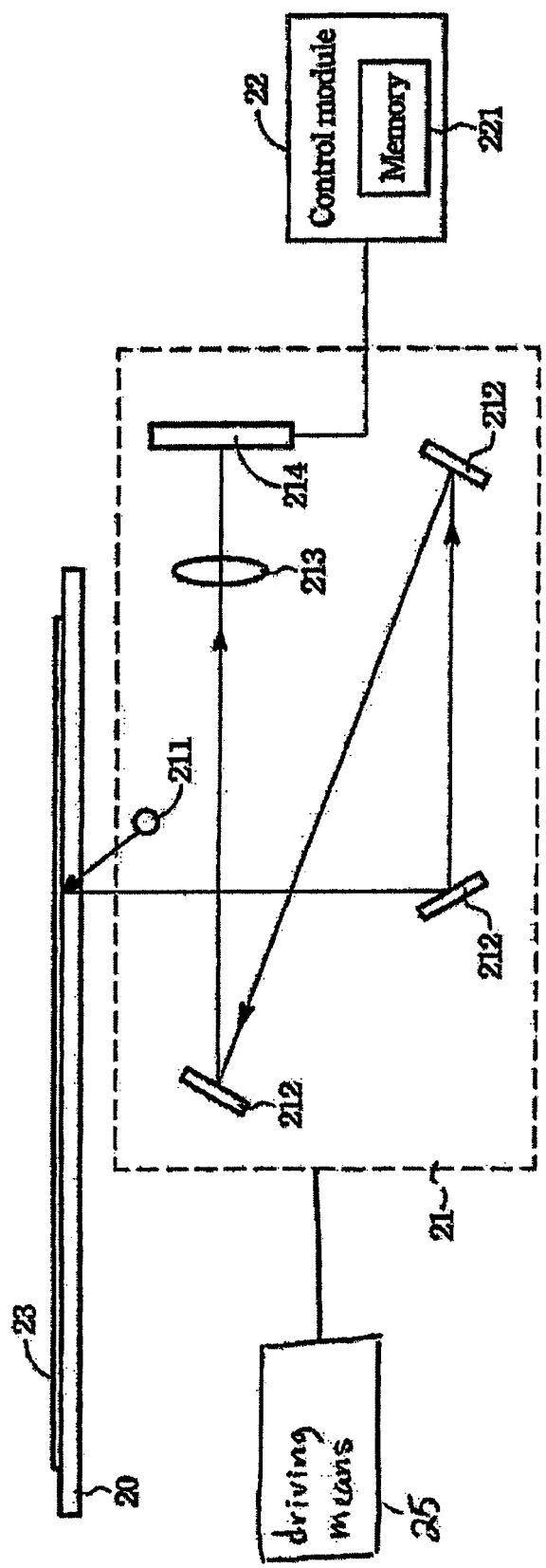
FIG. 2A is a schematic view of an image scanning system of a scanner according to this invention.

Referring to FIG. 2A, the image scanning system of the scanner according to this invention includes a transparent holding board 20, an optical chassis 21 and a control module 22. The transparent holding board 20 is preferably made of glass or acrylic. The scanning object 23 is located above the holding board and the optical chassis 21 is located below the holding board 20 for reading the image data of the scanning object 23. The optical chassis 21 is a modular assembly consisting of a linear lamp tube 211, a plurality of reflection mirrors 212, a lens 213 and an image capturing element 214 (CCD). The linear lamp tube 211 projects light on the scanning object 23 located above the holding board 20, the reflecting mirrors 212 receive the reflecting image from the scanning object 23 and through refraction of the lens 213 to form an image of the object 23 on the image capturing element 214. The image capturing element 214 captures the image of the scanning object 23. As the image captured by the image capturing element 214 is only a portion of the total image of the object 23, a driving means 25 shall be used to drive the optical chassis 21 to move along the holding board 20 for scanning the entire object 23 completely.

The scanner of this invention further includes a control module 22 which has a built in memory 221 for storing the calibration parameters of the scanner. The control module 22 based on the calibration parameters stored in the memory 221 performs calibration and compensation process for the image captured by the image capturing element 214 to achieve a desired scanning image quality. The setting method of the calibration parameters in the scanner will be described in the following.

For same type of scanners, their internal elements are made by standardized specifications, hence the calibration parameters for setting the left and right margins, and starting scanning value and intensity of the lamp tube generally do not have much difference. For the scanners that do not have high demand of scanning quality, the calibration parameters may be directly stored in the Read Only Memory (ROM) or systems file at the plant site before shipment. Therefore the scanner of this system does not have to perform calibration process for deriving the calibration parameters before every scanning operation, and may directly perform image scanning on the scanning object through the control module or system file to fetch the calibration parameters. As a result, scanning for the object image may be done and completed more rapidly. Furthermore, through the calibration parameters provided by the memory of the control module, the scanning image may have desired calibration and compensation thereby to obtain a better image scanning quality.

Figure 2B:
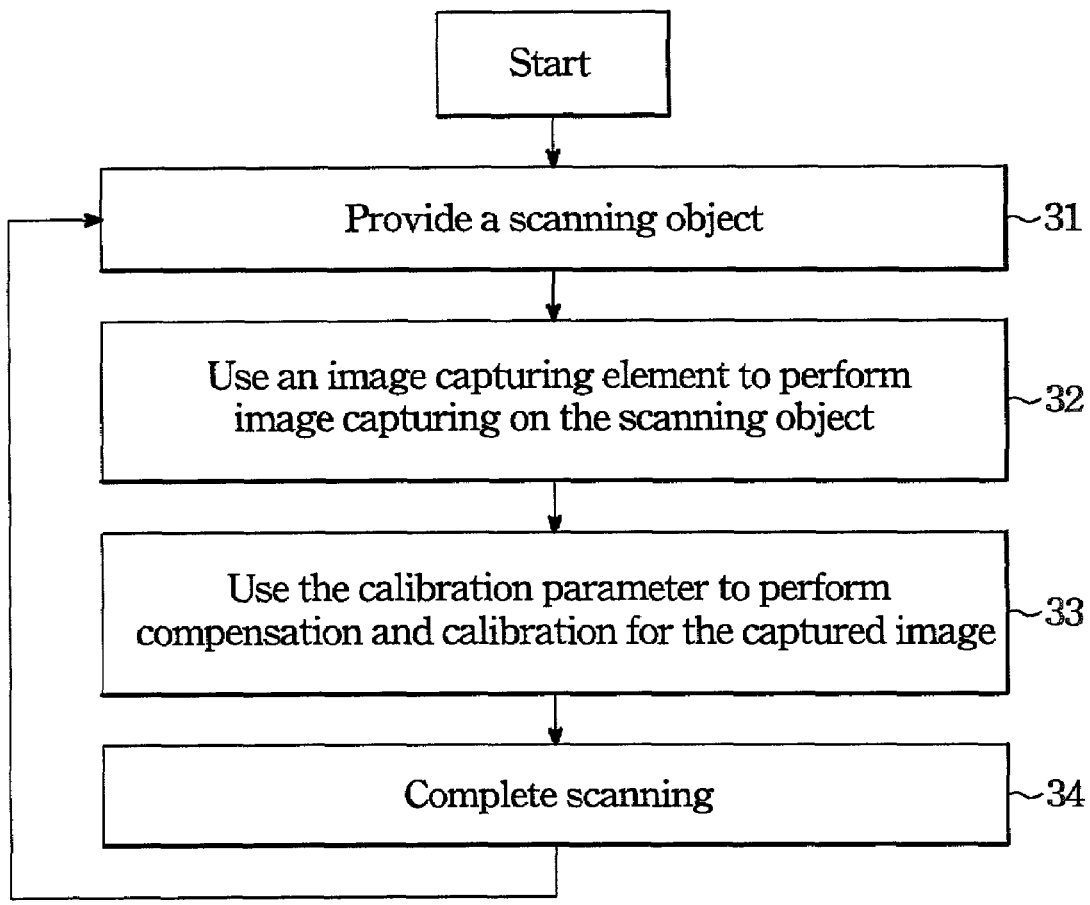
FIG. 2B is a process flow of an image scanning method according to a first embodiment of this invention.

Referring to FIG. 2B the process flow of a first embodiment of the image scanning system of this invention is illustrated. The process includes the steps of: providing a scanning object 31, using the image capturing element of the optical chassis to capture the image of the scanning object 32, using the calibration parameters stored in the memory of the control module or system file to control the image capturing element to perform calibration and compensation for the captured image 33, completing the scanning for the object 35 and repeating the step 31.

In the process flow a of a second preferable embodiment, the control module uses the Random Access Memory (RAM) for storing the calibration parameters. As the data stored in the RAM will be cleared and lost after the scanner is power off, in this embodiment every time the scanner is power on, an automatic calibration will be performed, and the most updated calibration parameters obtained in the calibration process will be stored in the RAM. Then in every subsequent scanning operation, the control module or system file will perform calibration and compensation process based on the calibration parameters stored in the memory. Thereby the scanner can get a better image scanning quality. Moreover, in this embodiment there is no need to perform calibration process for every scanning; a great deal of time that might otherwise spent for calibration process in the scanning operation will be saved.

Figure 3:
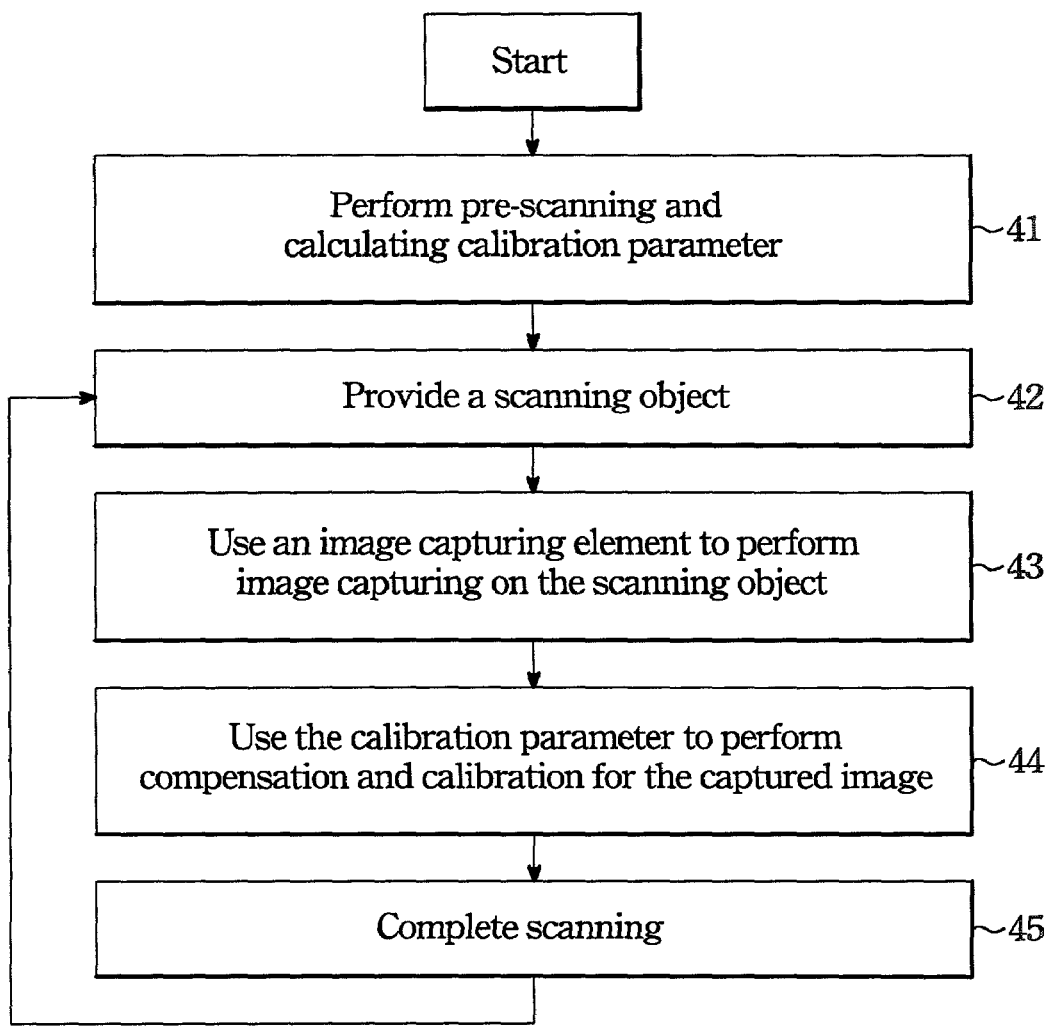
FIG. 3 is a process flow of an image scanning method according to a second embodiment of this invention.

Referring to FIG. 3 the process flow of the second embodiment is illustrated. The process includes the steps of: performing a pre-scanning process and calculating the calibration parameters 41, providing a scanning object 42, using the image capturing element of the optical chassis to capture the image of the scanning object 43, using the calibration parameters stored in the memory of the control module or system file to control the image capturing element to perform calibration and compensation for the captured image 44, completing the scanning for the object 45 and repeating the 42.

Figure 4:
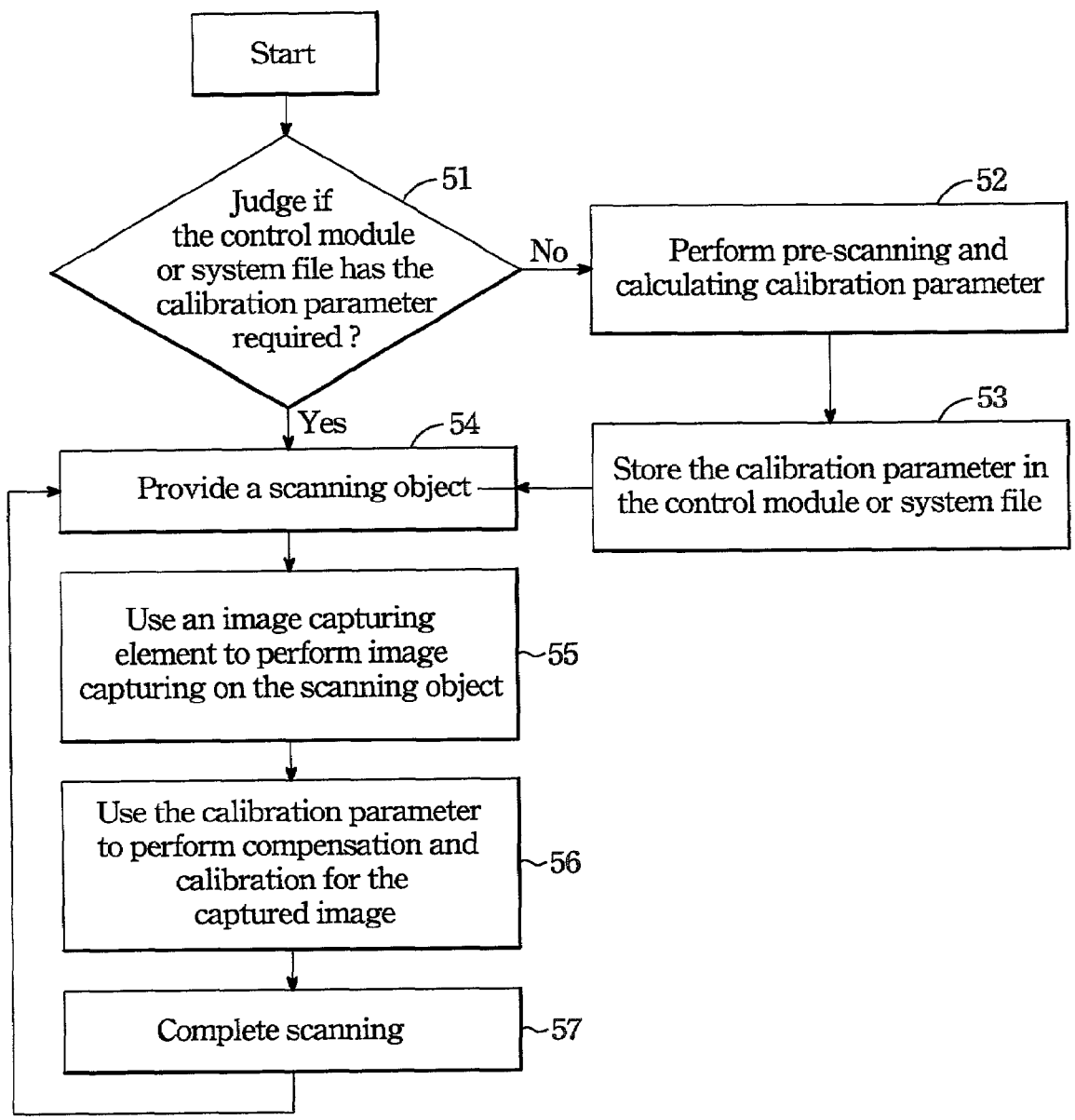
FIG. 4 is a process flow of an image scanning method according to a third embodiment of this invention.

Before proceeding scanning, the scanner of this invention may also determine if the control module or system file has the required calibration parameters. If the outcome is positive, the scanning operation will be directly executed. Otherwise a pre-scanning operation will be performed and calculation of the calibration parameters for the scanner will be done. Details will be described in the third embodiment shown in FIG. 4.

The process includes the steps of: determining if the control module or system file has the calibration parameters required 51; if negative, perform pre-scanning and calculate the calibration parameters 52 and store the obtained calibration parameters in the control module or system file 53; if positive, provide a scanning object 54; using the image capturing element of the optical chassis to capture the image of the scanning object 55, using the calibration parameters stored in the memory of the control module or system file to control the image capturing element to perform calibration and compensation for the captured image 56; completing the scanning for the object 57 and repeating the step 54.

While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An image scanning method for a scanner, comprising:
   calculating a calibration parameter responsive to determining that the calibration parameter is not stored in memory;
   using an image capturing element to perform image capturing on a scanning object;
   calibrating the captured image using the calibration parameter; and
   completing image scanning for the object and repeating the using an image capturing element for a subsequent scanning object without further calculating.

2. The image scanning method of claim 1, further comprising:
   holding the scanning object via a holding board;
   capturing the image of the scanning object via an optical chassis comprising an image capturing element; and
   storing the calibration parameter via a control module comprising a read only memory (ROM) and reading the stored calibration parameter to calibrate the captured image.

3. The image scanning method of claim 2, wherein the holding the scanning object comprises holding the scanning object via the holding board comprising glass or acrylic material.

4. The image scanning method of claim 2, wherein the capturing the image of the scanning object comprises capturing the image of the scanning object via the image capturing element of the optical chassis comprising a charge coupled device (CCD).

5. The image scanning method of claim 2, further comprising:
   projecting on the scanning object via a linear light source to generate a reflecting image reflecting the reflected image via one or more reflecting mirrors; and
   refracting the reflected image through a lens to form an image on the image capturing element.

6. The image scanning method of claim 2, further comprising moving the optical chassis along the holding board to scan the object via a driver.

7. The image scanning method of claim 2, wherein the storing the calibration parameter comprises storing the calibration parameter via the control module comprising a selected system file.

8. An image scanning method for a scanner, comprising:
   determining if a calibration parameter is stored and calculating a calibration parameter if no calibration parameter is stored;
   using an image capturing element to perform image capturing on a scanning object;
   using the calibration parameter obtained at the determining to perform compensation and calibration for the captured image; and
   completing image scanning for the object and repeating said image capturing and said compensation without further performing the determining.

9. The image scanning method of claim 8, wherein the following are performed when the outcome of the determining is negative:
   performing pre-scanning and calculating a calibration parameter; and
   storing the calculated calibration parameter in a control module or in a selected system file.

10. The image scanning method of claim 8, further comprising:
    holding the scanning object via a holding board;
    capturing the image of the scanning object via an optical chassis comprising an image capturing element; and
    storing the calibration parameter via a control module, and using the stored calibration parameter to perform compensation and calibration for the captured image.

11. The image scanning method of claim 10, wherein the holding the scanning object comprises holding the scanning object via the holding board comprising glass or acrylic material.

12. The image scanning method of claim 10, wherein the capturing the image of the scanning object comprises capturing the image of the scanning object via the image capturing element of the optical chassis comprising a charge coupled device (CCD).

13. The image scanning method of claim 10, further comprising:
    projecting on the scanning object via a linear light source to generate a reflecting image;
    reflecting the reflected image via one or more reflecting mirrors; and
    refracting the reflected image through a lens to form an image on the image capturing element.

14. The image scanning method of claim 10, further comprising moving the optical chassis along the holding board to scan the object via a driver.

15. The image scanning method of claim 10, wherein the storing the calibration parameter comprises storing the calibration parameter via the control module comprising a selected system file.

16. An article of manufacture, comprising: a storage medium having stored thereon one or more instructions that, when executed by a processor, result in:
    calculating a calibration parameter responsive to determining that the calibration parameter is not stored in memory;
    using an image capturing element to perform image capturing on a provided scanning object;
    using the calibration parameter to at least or calibrate the captured image; and
    completing image scanning for the object and repeating said using an image capturing element for a subsequent scanning object without further calculating.

17. The article of claim 16, wherein the instructions, when executed by a processor, further result in:
    storing the calibration parameter via a control module comprising a read only memory (ROM); and
    using the stored calibration parameter to perform compensation and calibration for the captured image.

18. The article of claim 16, wherein the instructions, when executed by a processor, further result in:
storing the calibration parameter via a control module comprising a selected system file; and
using the stored calibration parameter to perform compensation and calibration for the captured image.

19. An article of manufacture, comprising: a storage medium having one or more instructions stored thereon that, when executed, result in:
determining if a calibration parameter is stored and calculating a calibration parameter if no calibration parameter is stored;
using an image capturing element to perform image capturing on a provided scanning object;
using the calibration parameter obtained at the determining to perform compensation and calibration for the captured image; and
completing image scanning for the object and repeating the image capturing and the compensation without further performing the determining.

20. The article of claim 19, wherein the instructions, when executed, further result in the following when the outcome of the determining is negative:
performing pre-scanning and calculating a calibration parameter; and storing the calculated calibration parameter in the control module.

21. The article of claim 20, wherein the instructions, when executed, further result in:
storing the calibration parameter via a control module; and
using the stored calibration parameter to perform compensation and calibration for the captured image.

22. The article of claim 20, wherein the instructions, when executed, further result in:
storing the calibration parameter via a control module comprising a selected system file; and
using the stored calibration parameter to perform compensation and calibration for the captured image.

23. An apparatus, comprising:
means for calculating a calibration parameter prior to image capturing and responsive to determining that the calibration parameter is not stored in memory;
means for performing image capturing on a provided scanning object;
means for at least calibrating the captured image using the calibration parameter read from memory; and
means for completing image scanning for the object without further involving the means for calculating.

24. The apparatus of claim 23, further comprising:
means for storing the calibration parameter via a control module comprising a read only memory (ROM); and
means for using the stored calibration parameter to perform compensation and calibration for the captured image.

25. The apparatus of claim 23, further comprising:
means for storing the calibration parameter via a control module comprising a selected system file; and
means for using the stored calibration parameter to perform compensation and calibration for the captured image.

26. An apparatus, comprising:
means for performing image capturing on a provided scanning object; and
means for determining if a calibration parameter is stored and calculating a calibration parameter if no calibration parameter is stored, for using the calibration parameter obtained at the determining to perform compensation and calibration for the captured image, and for completing image scanning for the object and repeating the image capturing and the compensation without further performing the determining.

27. The apparatus of claim 26, further comprising:
means for performing pre-scanning and calculating a calibration parameter when the outcome of the determining is negative; and
means for storing the calculated calibration parameter in the control module.

28. The apparatus of claim 27, further comprising:
means for storing the calibration parameter via a control module; and
means for using the stored calibration parameter to perform compensation and calibration for the captured image.

29. The apparatus of claim 27, further comprising:
means for storing the calibration parameter via a control module comprising a selected system file; and
means for using the stored calibration parameter to perform compensation and calibration for the captured image.

30. The method of claim 1, further comprising:
storing the calibration parameter in memory; and
reading the stored calibration parameter to calibrate the captured image.

31. The method of claim 30, wherein the memory comprises random access memory (RAM).

32. The method of claim 1, further comprising:
performing a pre-scanning operation responsive to determining that the calibration parameter is not stored in memory, wherein the performing occurs before the calculating.

33. The method of claim 1, further comprising:
compensating the captured image using the calibration parameter.

34. The method of claim 1, further comprising:
storing the calibration parameter in memory; and
reading the stored calibration parameter to calibrate the captured image.

35. The article of claim 16, wherein the instructions, when executed by a processor, further result in:
storing the calibration parameter via a control module comprising a random access memory (RAM); and
using the stored calibration parameter to compensate the captured image.

36. The article of claim 16, wherein the instructions, when executed by a processor, further result in:
storing the calibration parameter via a control module comprising a random access memory (RAM); and
using the stored calibration parameter to calibrate the captured image.

37. The apparatus of claim 23, further comprising:
means for storing the calibration parameter via a control module comprising a random access memory (RAM); and
means for using the stored calibration parameter to compensate the captured image.

38. The apparatus of claim 23, further comprising:
means for storing the calibration parameter via a control module comprising a random access memory (RAM); and
means for using the stored calibration parameter to calibrate the captured image.

* * * * *

UNITED STATES PATENT AND TRADEMARK OFFICE
CERTIFICATE OF CORRECTION

PATENT NO.       : 7,492,488 B2                                           Page 1 of 1
APPLICATION NO.  : 09/832098
DATED            : February 17, 2009
INVENTOR(S)      : Liu It is certified that error appears in the above-identified patent and that said Letters Patent is hereby corrected as shown below:

At column 6 claim 16, line 53, please replace "image reflecting the reflected image via one or more reflecting mirrors; and" with --image;
reflecting the reflected image via one or more reflecting mirrors; and--.

At column 6 claim 16, line 57, please replace "at least or" with --at least compensate or--.

Signed and Sealed this

Sixteenth Day of March, 2010

David J. Kappos
*Director of the United States Patent and Trademark Office*